United States Patent [19]
Vandenengel

[11] Patent Number: 6,070,797
[45] Date of Patent: Jun. 6, 2000

[54] POSITIONING DEVICE FOR A SMART CARD READER

[75] Inventor: Gerald W. Vandenengel, Grafton, Mass.

[73] Assignee: Info Telecom, Vendenheim Cedex, France

[21] Appl. No.: 09/006,161

[22] Filed: Jan. 13, 1998

[51] Int. Cl.[7] ............................. G06K 7/06; G06K 13/06

[52] U.S. Cl. ............................................ 235/441; 235/483

[58] Field of Search ................................... 235/441, 475, 235/482, 483

[56] References Cited

U.S. PATENT DOCUMENTS 5,091,618  2/1992  Takasashi ................................. 235/441

FOREIGN PATENT DOCUMENTS 0879026   10/1996  Japan ............................. G06K 17/00
9423399 A1  4/1994  United Kingdom ............. G07F 7/08

*Primary Examiner*—Donald Hajec
*Assistant Examiner*—Larry Taylor
*Attorney, Agent, or Firm*—Rabin & Champagne, PC

[57] ABSTRACT

A smart card reader includes a smart card reader housing, and at least one movable locator connected to the housing. The movable locator has one end positionable away from the housing for engagement with an edge of a smart card.

14 Claims, 3 Drawing Sheets

POSITIONING DEVICE FOR A SMART CARD READER

FIELD OF THE INVENTION

This invention relates to readers for smart cards and, in particular, to a positioning device for a smart card reader, such as a slotless smart card reader, that is movable in and out of a card locating position.

BACKGROUND OF THE INVENTION

Smart cards have become widespread as the uses for such cards multiplies. Subway riders can now purchase a card with a desired value programmed into the card, with the stored value decreasing by an amount equal to the fare each time the user uses the card to gain access to the subway system. Similar cards are used in vending machines, allowing users to carry one card to use for all their vending purchases instead of needing change or single dollars. The programmed amount on the card is reduced each time a purchase is made. Prepaid telephone smart cards are also popular.

Furthermore, smart cards that do not store cash information can also be used. For example, driver's licenses can store personal or medical data, etc.

One disadvantage with smart cards is that the user has no easy way of determining the data that is stored on the card unless he or she remembers it. If the user forgets, then he or she normally must go to a machine that accepts such cards to find out what is stored on the card (e.g., the amount of money that is left on the card).

Portable card readers have been developed to allow a user to more easily determine the remaining value on all the cards in his or her possession. Such a reader, for example, is shown in U.S. Pat. No. 5,015,830 to Masuzawa et al., which features a reader having a slot into which the card is inserted, electronic reading circuits for reading the information stored on the card, and a display for displaying the read information to the user. Although the Masuzawa et al. device is small enough to be portable, it is, nevertheless, too large for many users to carry it around with them on a regular basis. Furthermore, the slot on such a device traps dirt and debris which can eventually render the device inoperative.

To overcome the above-deficiencies, a slotless smart card reader has been proposed in U.S. Pat. No. 5,517,011 to Vandenengel. In this patent, the smart card reader is positioned above and spaced from a smart card. The smart card is a standard smart card that stores information and includes a plurality of contact pads which are used by the reader to access the stored information.

The bottom surface of the reader includes electrical contacts that correspond to the contacts on the smart card, as explained further below. Further, the inside of the reader housing includes a circuit board containing standard circuitry for reading information stored on the smart card via the electrical connection established by the contacts. The reader is typically activated by pressing down on a switch.

To use this reader, the user places the smart card against the reader. Upon activation of the switch, power is delivered to the circuit board from a suitable power source. Information stored on the smart card is read and displayed on a display.

In order to fulfill their desired purpose, smart card readers often will be carried by a user for the entire day. As such, it is desirable that the reader be as small as possible, so that it may easily fit within a user's pocket, wallet or purse, or be attached to a key chain, for instance. However, it is also important that the terminals on the smart card and those on the smart card reader be accurately aligned when using the smart card reader, so that a good electrical connection is made between the smart card reader and the smart card. Conventionally, this has been accomplished by providing the bottom surface of the reader with two perpendicular fixed guides that protrude from the bottom surface at respective edges thereof to guide and position the card when it is placed against the bottom surface of the reader. When the card is properly located, two corresponding perpendicular edges of the card will abut against the respective guides of the reader, so that the contacts of the smart card are positioned in alignment with the contacts of the reader. However, typically the contacts on the card are located in a standardized position, i.e., positioned away from the corner of the card defined by the two perpendicular edges which come in contact with the guides of the reader. As such, in order to properly position the card, the guides of the reader must likewise be placed a corresponding distance from the contacts of the reader. Thus, the size of the conventional reader has been limited by the location of the contacts on the card relative to a corner of the card. Thus, there is a need for a smart card reader which can accurately position the smart card relative to the reader, but which is not restricted in size by the location of the contacts on the smart card.

SUMMARY OF THE INVENTION

It is, therefore, a principal object of this invention to provide an enhanced positioning device for a smart card reader.

It is another object of the invention to provide an enhanced positioning device for a smart card reader that solves the above mentioned problems.

These and other objects of the present invention are accomplished by the enhanced positioning device for a smart card reader disclosed herein.

According to one aspect of the invention, a smart card reader having a housing is provided. A movable locator is connected to the housing. The movable locator has one end positionable away from the housing for engagement with an edge of a smart card. This exemplary arrangement allows for the smart card reader housing to be made much smaller than conventional smart card readers, which had only fixed locators or guides for positioning the smart card, and which were thus limited in size by the location of the terminals on the smart card relative to the edges of the smart card.

According to a further exemplary embodiment of the present invention, the smart card reader housing has a fixed locator attached to a surface thereof for engagement with a further edge of the smart card. This arrangement allows for the smart card to be precisely located both in an x-direction (i.e., along a length of the smart card) and in a y-direction (i.e., along a width of the smart card).

According to yet a further aspect of the present invention, instead of a fixed locator, a further movable locator may be provided, which likewise has an end positionable away from the housing for engagement with the further edge of the smart card. This arrangement allows for yet a further reduction in the size of the smart card reader, while still allowing the smart card to be precisely located in both the x- and y-directions.

According to another exemplary aspect of the invention, the movable locator or locators can each be a rigid arm pivotally connected to the smart card reader housing. The rigid arm may be pivoted to a first position in which the movable locator is coincident with the smart card reader housing, and to a second position in which the one end is positioned away from the housing. Alternatively, the movable locator may be slidable from a first position in which the movable locator is disposed essentially entirely within the smart card reader housing, to a second position in which the one end is positioned away from the housing. Additionally, or alternatively, the movable locator may be flexible, and be retractable into the smart card reader housing. Moreover, instead of providing a separate movable locator, the locator can form a movable part of the housing. These various arrangements allow for an accurate positioning of the smart card relative to the reader, while allowing the size of the reader to be minimized.

Typically, the smart card reader housing has an electrical contact on a surface thereon. According to an exemplary embodiment of the invention, the electrical contact is advantageously in alignment with a corresponding electrical contact located on a surface of the smart card when the one end of the movable locator is positioned away from the housing and in engagement with the edge of the smart card.

According to yet a further aspect of the present invention, the smart card reader additionally includes at least one switch located within the housing. Advantageously, the movable locator activates the switch when the one end is positioned away from the housing. This eliminates the need for additional switch actuators, and ensures that the switch is activated only when the card is in the correct position, i.e., with the contacts of the card and the contacts of the reader in alignment. The switch may be at least one of a card detect switch and a power-on switch, although other types of switches are also within the scope of the invention.

Preferably, the one end of the movable locator has a projecting member thereon for engagement with the edge of the smart card. This ensures the movable locator will be engaged by the smart card.

DETAILED DESCRIPTION OF THE PREFERRED EMBODIMENTS

The invention will now be described in more detail by way of example with reference to the embodiments shown in the accompanying figures. The following described embodiments are only presented by way of example and should not be construed as limiting the inventive concept to any particular physical configuration.

Figure 1:
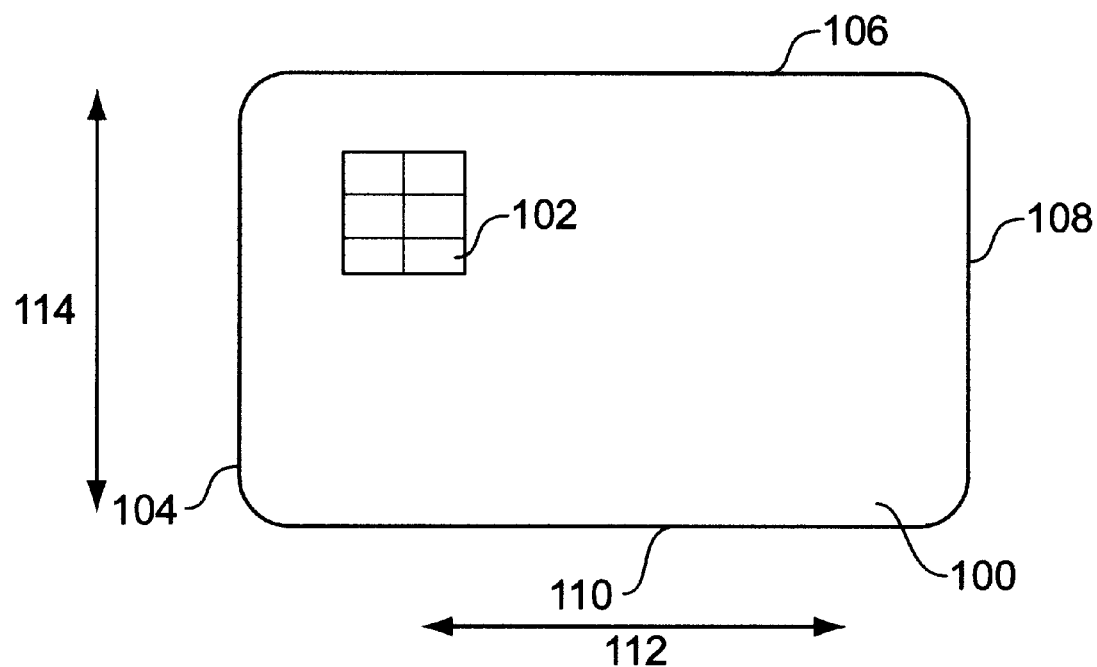
FIG. 1 is an elevational view of a conventional smart card.

Referring to FIG. 1, a conventional smart card 100 is illustrated. As shown, the smart card 100 has one or more electrical contacts 102 located on a surface thereof. Typically, the placement of the contacts 102 is standardized relative to the edges of the smart card 100, so that the card 100 can be used in a variety of readers.

As shown, the card 100 has a generally rectangular shape defined by its four edges 104, 106, 108, 110. In order to properly locate the contacts 102 relative to a reader, typically at least two perpendicular edges (such as edge 104 and edge 106) are placed against guides or locators formed on the reader, to position the card 100 both in an x-direction 112 and a y-direction 114.

Figure 2:
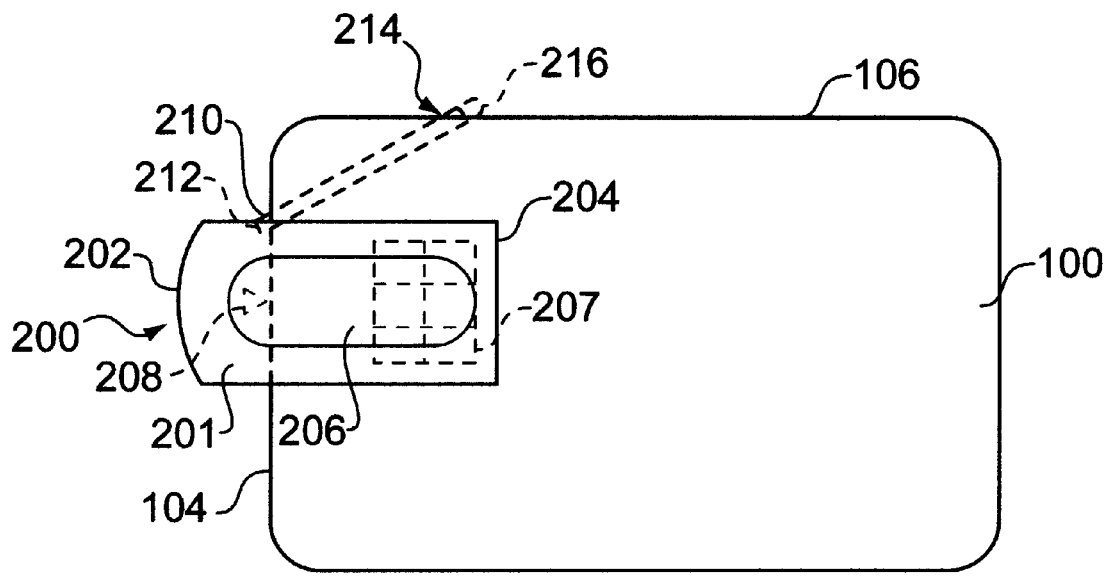
FIG. 2 is an elevational view of a smart card reader positioned over a smart card, according to a first exemplary embodiment of the invention.

Referring to FIG. 2, a first exemplary embodiment of the present invention is shown positioned over a conventional smart card 100. The smart card reader 200 is shown as having an elongated housing 201, with one end 202 of housing 201 being essentially curvilinear, and the opposite end 204 being essentially linear, but the aspects of the invention can be equally applied to other types and shapes of smart card readers.

In particular, the smart card reader 200 includes a liquid crystal display (LCD) panel 206 on an upper surface of housing 201, which displays information stored on the smart card 100, and which operates in a known manner. The back surface of the smart card reader housing 201 includes one or more electrical contacts 207, which are electrically coupled with the contacts 102 on the card 100, when the smart card 100 is properly positioned relative to the reader 200. The back surface of the smart card reader housing 201 also includes a fixed locator 208, which the edge 104 of card 100 abuts against to position the card in the x-direction. Although this embodiment illustrates locator 208 as being fixed, the present invention is not limited to such a locator. Alternatively, the locator can be movable, in a manner to be subsequently explained.

The smart card reader 200 further includes a movable locator 210. Movable locator 210 can be a rigid arm having a first end 212 pivotally connected to housing 201, and a second end 214 that is movable away from the housing 201 when the rigid arm is pivoted. The second end 214 may be provided with a projection 216, that provides a catch for the edge 106 of card 100.

Figure 3:
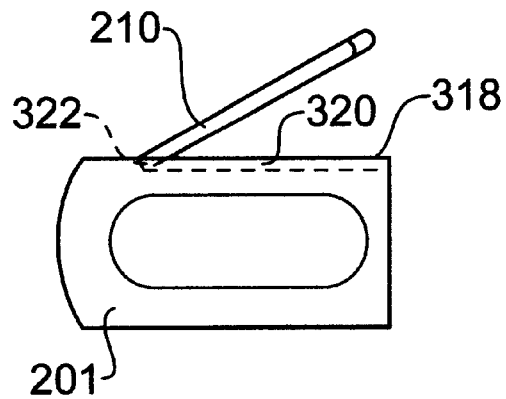
FIG. 3 is an elevational view of the smart card reader shown in FIG. 2, but without the smart card.
Figure 4:
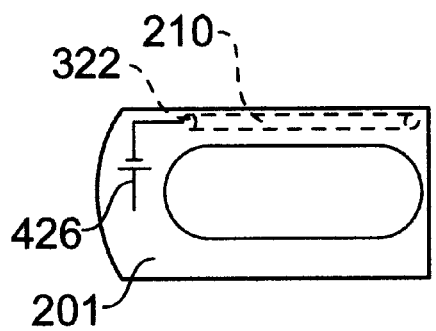
FIG. 4 is an elevational view of the smart card reader shown in FIG. 3, but with the locating device in a retracted position.

As best shown in FIGS. 3 and 4, the movable locator 210 is normally retracted when not in use, so as to minimize the size of the reader 200. For example, the movable locator can be positioned parallel to an edge 318 of housing 201 when in the retracted position. Moreover, in order to further reduce the size of the reader 200, the edge 318 can be provided with a recess or groove 320, which accommodates the movable locator 210 when in the retracted position. Other arrangements for accommodating the movable locator when in the retracted position are within the scope of the present invention.

The movable locator 210 is pivotally connected to housing 201 at pivot point 322. The pivotal connection between movable locator 210 and housing 201 is adapted to prevent a 360° rotation of the movable locator 210 about pivot point 222. Instead, the movable locator 210 is allowed to pivot only a predetermined amount, so that when in the fully non-retracted position, the distance between second end 214 and the contacts 207 of the reader 200 is essentially the same as the distance between the edge 106 and the contacts 102 of the smart card 100. The stopping of the pivoting movement of the movable locator 210 can be accomplished in any known manner. For example, the edge 318 of the housing 201 can be provided with a stop member (not shown), which the movable locator 210 abuts against when in the fully non-retracted position.

During use, a user places card 100 against the back surface of housing 201, with the edge 104 of the card against the locator 208, and with edge 106 of the card against projection 216. The user slides the card 100 relative to the reader 200 in the y-direction 114, which causes movable locator 210 to pivot outward to a predetermined position. Once in the predetermined position, the movable locator is prevented from pivoting outward any further, upon which the contacts 102 of the card 100 are precisely aligned with the contacts 207 of the reader 200.

Preferably, the reader 200 includes at least one switch 426 (shown only schematically in FIG. 4) located within the housing 201. The switch 426 is coupled to the movable locator 210, so that when the movable actuator is pivoted to the fully non-retracted position, the switch is activated. The switch 426 may be, for example, a card detect switch and/or a power-on switch. The card detect switch would typically be located in series with a power circuit (not shown) of the reader, and would need to be activated in order to provide a closed power circuit. This would help to prevent an electrical shorting between the electrical contacts, which may otherwise occur if the card 100 were moved while the reader 200 was powered on.

Figure 5:
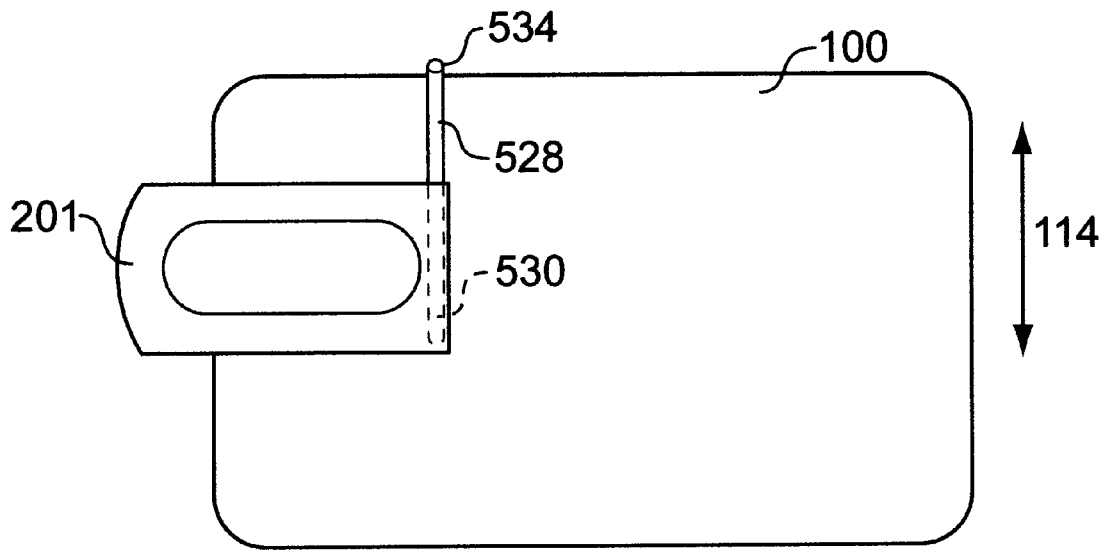
FIG. 5 is an elevational view of a smart card reader, according to a second exemplary embodiment of the invention.

Referring to FIG. 5, an alternative embodiment of the present invention is shown. In particular, in this exemplary embodiment, the movable locator 528 slides in a linear direction, i.e., in the y-direction 114. When not in use, the locator 528 slides within the reader housing, which is provided with a receptacle 530 for accommodating movable locator 528. However, when fully extended, the movable locator precisely locates the card 100 in the y-direction 114, in the same manner as the aforementioned embodiment.

Figure 6:
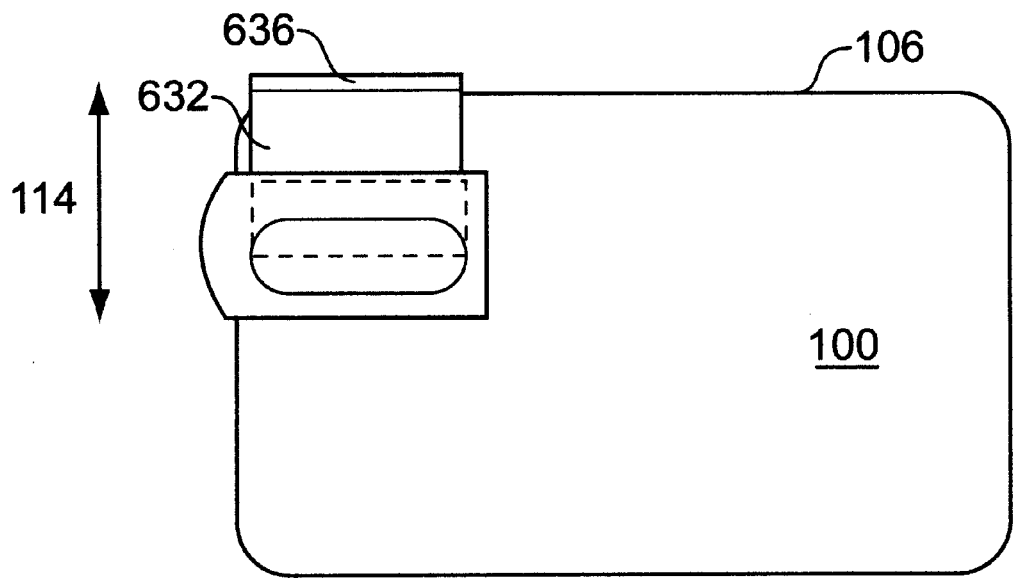
FIG. 6 is an elevational view of a smart card reader, according to a third exemplary embodiment of the invention.

In this embodiment the movable locator 528 can be configured as a rigid arm, or alternatively as a flexible arm formed, for example, from a flexible wire. Moreover, instead of an arm, the movable locator can be a portion 632 of the reader housing that slides outward, such as shown in FIG. 6. This arrangement advantageously provides a larger area of contact along the edge 106 of card 100. In both of these embodiments, the ends of the movable locators may be provided with projections (534 in FIG. 5, and 636 in FIG. 6) for engaging with the edge 106 of card 100, in the manner previously described. All other aspects of these embodiments can be configured in a similar manner as the first described embodiment.

Figure 7:
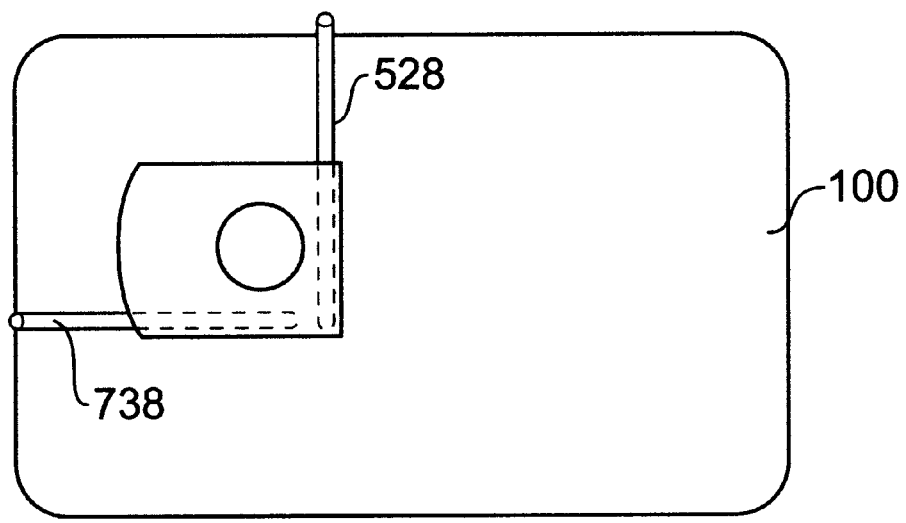
FIG. 7 is an elevational view of a smart card reader, according to a fourth exemplary embodiment of the invention.

Referring to FIG. 7, the fixed locator can be replaced with a movable locator 738, which allows yet a further reduction in the size of the reader. Although in this embodiment, movable locator 738 is configured in the same manner as the movable locator 528 described in conjunction with FIG. 5, the movable locator can instead be configured in the same manner as any of the other previously described movable locators, and/or used in conjunction with any of the aforementioned movable locators.

The above-described invention provides for a personal smart card reader which can easily read cards, yet is capable of being made small enough to be carried in a shirt pocket, purse, or wallet.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention is susceptible to various modifications, changes, and adaptations, and the same are intended to be comprehended within the meaning and range of equivalents of the appended claims.

What is claimed:

1. A smart card reader, comprising:
   a smart card reader housing; and
   at least one movable locator connected to said housing, and having one end positionable away from said housing for engagement with an edge of a smart card,
   wherein said movable locator is slidable from a first position in which said movable locator is disposed essentially entirely within said smart card reader housing, to a second position in which the one end is positioned away from said housing.

2. The smart card reader defined in claim 1, wherein said smart card reader housing has a fixed locator attached to a surface thereof for engagement with a further edge of the smart card.

3. The smart card reader defined in claim 1, wherein said smart card reader housing has an electrical contact on a surface thereon, said electrical contact being in alignment with a corresponding electrical contact located on a surface of the smart card when the one end of said movable locator is positioned away from said housing and in engagement with the edge of the smart card.

4. The smart card reader defined in claim 1, wherein said smart card reader further comprises at least one switch located within said housing; wherein said movable locator activates said switch when the one end is positioned away from said housing.

5. The smart card reader defined in claim 4, wherein said switch comprises at least one of a card detect switch and a power-on switch.

6. The smart card reader defined in claim 1, wherein the one end of said movable locator has a projecting member thereon for engagement with the edge of the smart card.

7. A smart card readers comprising:
   a smart card reader housing; and
   at least one movable locator connected to said housing, and having one end positionable away from said housing for engagement with an edge of a smart card, wherein said movable locator comprises a flexible movable locator that is retractable into said smart card reader housing.

8. A smart card reader, comprising:
   a smart card reader housing;
   a first movable locator connected to said housing and having one end positionable away from said housing for engagement with an edge of a smart card; and
   a second movable locator connected to said housing, and having one end positionable away from said housing for engagement with a further edge of the smart card.

9. The smart card reader defined in claim 8, wherein the first movable locator is a rigid arm pivotally connected to said smart card reader housing, and being pivotal to a first position in which said movable locator is coincident with said smart card reader housing, and to a second position in which the one end is positioned away from said housing.

10. A smart card reader, comprising:
    a smart card reader housing having an electrical contact for engagement with a corresponding electrical contact on a smart card, and having at least one movable locator having one end positionable away from said electrical contact of said housing for engagement with an edge of the smart card, said smart card reader housing further having an additional movable locator having one end positionable away from said electrical contact of said housing for engagement with a further edge of the smart card.

11. The smart card reader defined in claim 10, wherein said electrical contact of said housing and the electrical contact of the smart card are in alignment when the one end of said movable locator is positioned away from said electrical contact of said housing and in engagement with the edge of the smart card.

12. The smart card reader defined in claim 10, wherein said smart card reader further comprises at least one switch located within said housing; wherein said movable locator activates said switch when the one end is positioned away from said electrical contact of said housing.

13. The smart card reader defined in claim 12, wherein said switch comprises at least one of a card detect switch and a power-on switch.

14. The smart card reader defined in claim 12 wherein the one end of said movable locator has a projecting member thereon for engagement with the edge of the smart card.

* * * * *